United States Patent
Ishikawa et al.

(10) Patent No.: US 8,359,910 B2
(45) Date of Patent: Jan. 29, 2013

(54) WATERPROOF CONNECTING STRUCTURE FOR PIPE

(75) Inventors: Hiroaki Ishikawa, Toyota (JP); Chikara Inoue, Chiryu (JP); Tetsu Yamada, Nagoya (JP); Fumihiro Shinkai, Chiryu (JP); Atsushi Ito, Anjo (JP); Ikumasa Nakamori, Anjo (JP)

(73) Assignees: Toyota Jidosha Kabushiki Kaisha, Toyota-shi (JP); Aisin Seiki Kabushika Kaisha, Kariya-shi (JP)

( * ) Notice: Subject to any disclaimer, the term of this patent is extended or adjusted under 35 U.S.C. 154(b) by 270 days.

(21) Appl. No.: 12/602,971

(22) PCT Filed: Jun. 13, 2008

(86) PCT No.: PCT/JP2008/061274
§ 371 (c)(1),
(2), (4) Date: Dec. 3, 2009

(87) PCT Pub. No.: WO2008/153213
PCT Pub. Date: Dec. 18, 2008

(65) Prior Publication Data
US 2010/0164225 A1 Jul. 1, 2010

(30) Foreign Application Priority Data
Jun. 15, 2007 (JP) .................. 2007-159441

(51) Int. Cl.
*G01M 15/09* (2006.01)
(52) U.S. Cl. .................. 73/114.37; 73/114.33
(58) Field of Classification Search .............. 73/114.31, 73/114.37, 114.32, 114.33
See application file for complete search history.

(56) References Cited

U.S. PATENT DOCUMENTS

| | | | |
|---|---|---|---|
| 4,489,595 A * | 12/1984 | Klomp et al. | 73/114.37 |
| 4,969,354 A * | 11/1990 | Kosuda et al. | 73/114.37 |
| 5,804,718 A * | 9/1998 | Nagasaka et al. | 73/202 |
| 5,939,628 A * | 8/1999 | Igarashi et al. | 73/202 |
| 6,363,779 B1 | 4/2002 | Hochenberger et al. | |
| 6,604,424 B1 | 8/2003 | Kawabe et al. | |
| 7,938,105 B2 * | 5/2011 | Gates et al. | 123/568.12 |
| 2004/0226357 A1 * | 11/2004 | Tanimoto et al. | 73/202.5 |
| 2006/0249115 A1 * | 11/2006 | Hashimoto et al. | 123/184.55 |

(Continued)

FOREIGN PATENT DOCUMENTS
EP 1 609 971 A1 12/2005
JP 58-066034 4/1983
(Continued)

OTHER PUBLICATIONS

Office Action mailed Dec. 21, 2010 in JP Application No. 2007-159441 and English translation thereof.

*Primary Examiner* — James Hewitt
(74) *Attorney, Agent, or Firm* — Kenyon & Kenyon LLP (57) ABSTRACT

A waterproof connecting structure for a pipe for connecting an intake passage of an internal combustion engine and an external gas detector to convey gas into the intake passage. The structure includes a connecting space to which the pipe is connected and a partition wall formed between the intake passage and the connecting space. The connecting space has a larger diameter than the pipe. The partition wall includes an elongate hole for placing the interior of the intake passage and the connecting space in fluid communication. This configuration prevents intrusion of droplets drifting in through intake air and allows a high degree of freedom for location of the pipe.

6 Claims, 5 Drawing Sheets

U.S. PATENT DOCUMENTS

| | | | |
|---|---|---|---|
| 2009/0020095 A1* | 1/2009 | Taira | 123/184.21 |
| 2009/0077967 A1* | 3/2009 | Gates et al. | 60/605.2 |
| 2009/0223476 A1* | 9/2009 | Shinkai et al. | 123/184.21 |

FOREIGN PATENT DOCUMENTS

| | | |
|---|---|---|
| JP | 60-093328 | 5/1985 |
| JP | 63-233294 | 9/1988 |
| JP | 09-068066 A | 3/1997 |
| JP | 11-141417 A | 5/1999 |
| JP | 11-159367 A | 6/1999 |
| JP | 2000-088688 A | 3/2000 |
| JP | 2005-048597 A | 2/2005 |
| JP | 2005-048736 A | 2/2005 |
| WO | WO 01/07884 A1 | 2/2001 |

\* cited by examiner

WATERPROOF CONNECTING STRUCTURE FOR PIPE

This is a 371 national phase application of PCT/JP2008/061274 filed 13 Jun. 2008, claiming priority to Japanese Patent Application No. 2007-159441 filed 15 Jun. 2007, the contents of which are incorporated herein by reference.

FIELD OF THE INVENTION

The present invention relates to a waterproof connecting structure for a pipe for connecting an intake passage of an internal combustion engine to an external gas detector so as to convey gas into the intake passage.

BACKGROUND OF THE INVENTION

A suction pressure sensor is sometimes provided in an internal combustion engine to control the internal combustion engine. To detect intake air pressure by the suction pressure sensor, a pipe is disposed between the suction pressure sensor and an intake passage such as a surge tank, as described in Japanese Laid-Open Patent Publication 2000-88688 and Japanese Laid-Open Patent Publication 9-68066.

In such a pipe, water droplets generated in the surge tank may attach to a hole formed in the pipe. The water droplets may pass through the hole and enter a gas filter provided within the pipe or even enter the suction pressure sensor, preventing high-accuracy detection by the suction pressure sensor. In addition, the water droplets that enter the pipe may freeze in a cold region thereby causing the pipe, the gas filter, or the suction pressure sensor to break.

Japanese Laid-Open Patent Publication 2000-88688 discloses an annular thickened portion around a hole of a pipe to prevent water from entering the pipe by keeping water droplets that move along the wall surface of the surge tank away from the hole of the pipe.

In this document, only approach and intrusion of the water droplets that move along the wall surface of the surge tank into the pipe can be prevented but intrusion of water droplets that drift through intake air into the pipe via the hole cannot be prevented.

Japanese Laid-Open Patent Publication 9-68066 discloses an elongate cylinder extending around a hole of a pipe and another cylinder, wherein the structure of the dual cylinders prevents water from entering the pipe.

The structure of this document can stop water droplets that drift in through intake air. However, the inner cylinder of the dual cylinders is provided on the wall surface on which a hole of the pipe is provided while an outer cylinder is provided on the wall surface opposite to the pipe hole. This configuration makes the intake passage such as a surge tank complicated and locations to provide such a waterproof structure are limited, which extremely reduces the degree of freedom for location of the pipe.

SUMMARY OF THE INVENTION

An object of the present invention is to provide a waterproof connecting structure for use in a pipe that can prevent intrusion of droplets moving along a wall surface of the surge tank as well as droplets drifting in through intake air and which allows high degree of freedom for location of the pipe.

In a first aspect, a waterproof connecting structure for a pipe for connecting an intake passage of an internal combustion engine and an external gas detector to convey gas into the intake passage is provided. The structure comprises a connecting space to which the pipe is connected and a partition wall formed between the intake passage and the connecting space. The connecting space has a larger diameter than the pipe. The partition wall includes a hole for placing the intake passage and the connecting space in fluid communication. The hole has a traverse transverse cross-sectional area having a shorter length and a longer length.

According this configuration, the transverse cross-sectional area of the hole defined in the partition wall is smaller than the partition wall. Thus, the possibility for the droplets drifting in through intake air as well as droplets moving along a wall surface of the intake passage to reach the hole can be lowered even when such droplets reach the partition wall.

In addition, water droplets that reach the hole tend to concentrate at a portion of the hole such as a longitudinal end thereof due to surface tension properties. However, since the transverse cross-sectional area of the hole is elongate, it is unlikely that a water membrane is formed on the entire hole. Thus, conveyance of gas to a gas detector is maintained in good condition.

Moreover, since it is unlikely that a water membrane is formed on the entire hole, the droplets drifting in through intake air, even if entering the connecting space from the hole, are easily drained. That is, it is hard for the water droplets to enter and stay in the connecting space.

The open area of the hole is smaller than that of the partition wall and the transverse cross-sectional area of the connecting space is enlarged as compared with that of the hole. Thus, it is less likely that water entering into the connecting space will narrow or block the hole even if such water resides in the connecting space. The diameter of the connecting space is also larger than that of the pressure conduit. Accordingly, it is less likely that water having entered the connecting space will block the distal opening. Therefore, conveyance of gas to a gas detector is maintained.

The above inventive structure provides waterproofing against the water droplets drifting in through intake air. This water-proof connecting structure is achieved by providing the pressure conduit with connecting space, the partition wall, and the hole. Thus, the degree of freedom in location for attaching the structure to the surge tank is extremely high.

In one embodiment, a part of the partition wall other than the hole may overlap with a part or all of a distal opening of the pipe, when viewed from a direction perpendicular to the partition wall.

According to this configuration, intrusion of water droplets into the distal opening becomes more difficult and waterproof properties are improved.

In another embodiment, a ratio of the shorter length to the longer length in the transverse cross-sectional area of the hole may be ½ or less.

According to this configuration, water droplets attached to the hole tend to concentrate at a portion of the hole due to surface tension properties and it is unlikely that a water membrane is formed on the entire hole. Thus, effective waterproofing is provided.

In still another embodiment, the hole may be offset to extend along an edge of the partition wall. The hole may extend longer along the edge and extend a shorter length in a radial direction of the partition wall.

According to this embodiment, water inside the connecting space is easily discharged to the intake passage. This configuration facilitates offsetting the distal opening of the pipe from the center of the hole. This reduces or prevents the transfer of water from the hole to the distal opening, whereby waterproof properties are enhanced.

In a second aspect, a waterproof connecting structure for a pipe for connecting an intake passage of an internal combustion engine and an external gas detector to convey gas into the intake passage is provided. The pipe includes a distal opening having a center. The structure comprises a connecting space to which the pipe is connected and a partition wall formed between the intake passage and the connecting space. The connecting space has a larger diameter than the pipe. The partition wall includes a hole for placing the intake passage and the connecting space in fluid communication, wherein the hole is offset from the center of the distal opening of the pipe.

According this configuration, the transverse cross-sectional area of the hole defined in the partition wall is smaller than the partition wall. Thus, the possibility for the droplets drifting in through intake air as well as droplets moving along a wall surface of the intake passage to reach the hole can be lowered.

In addition, the center of the distal opening of the pipe is offset from the hole. Thus, even if the hole is blocked by the water droplets that reach the hole, the water membrane in the hole is unlikely to contact the distal opening, even if the water membrane is moved by pressure vibration on the side of intake passage. Accordingly, intrusion of water from the hole to the pipe is unlikely to occur.

The open area of the hole is smaller than that of the partition wall covering the connecting space and the transverse cross-sectional area of the connecting space is enlarged as compared with that of the hole. Thus, it is less likely that water entering into the connecting space will narrow or block the hole even if such water resides in the connecting space. The diameter of the connecting space is also larger than that of the pressure conduit. Accordingly, it is also less likely that water having entered the connecting space will block the distal opening. Therefore, conveyance of gas to a gas detector is maintained.

The above inventive structure provides waterproofing against the water droplets drifting in through intake air. This water-proof connecting structure is achieved by providing the pressure conduit with connecting space, the partition wall, and the hole. Thus, the degree of freedom in location for attaching the structure to the surge tank is extremely high.

In one embodiment, the hole may be offset to extend along an edge of the partition wall.

According to this configuration, the water entering the connecting space is easily drained from the hole to the intake passage, whereby the water-proofing effect is enhanced.

In another embodiment, the edge on which the hole extends may be an edge including a lowermost part of the partition wall relative to gravitational direction.

According to this configuration, when the amount of water intruded in the connecting space is increased, water tends to move to a lowermost part of the connecting space in a gravitational direction. Accordingly, a large amount of water in the connecting space is easily drained, whereby the water-proofing effect is enhanced.

In yet another embodiment, a distal end of the pipe may protrude into the connecting space and the distal opening of the pipe may be spaced from an internal surface of the connecting space.

According to this configuration, entrance of water on the internal surface of the connecting space to the distal opening of the pipe is reduced or prevented, whereby the water-proofing effect is enhanced.

In still another embodiment, the connecting space may be a cylindrical space. The hole may be formed of two sides, with one side defining the hole by a curvature extending along the edge of the partition wall at a central angle less than 180° and the other being a straight or curved side.

According to this configuration, the hole gradually narrows from the center of the hole toward the opposite ends. This causes water to concentrate at the opposite ends due to surface tension properties and a water membrane is unlikely to occur at the center. Thus, conveyance of gas to a gas detector through the hole is maintained in good condition.

Moreover, since it is unlikely that a water membrane is formed on the entire hole, the droplets drifting in through intake air, even if entering the connecting space from the hole, are easily drained from the hole to the outside along the edge of the partition wall. That is, it is hard for the water droplets to enter and stay in the connecting space.

In another embodiment, the gas detector may be a suction pressure sensor for measuring air pressure in the intake passage.

According to this configuration, the waterproof connecting structure provides a suction pressure sensor as a gas detector with adequate waterproofing and the degree of freedom in location for attaching the structure to the surge tank is extremely high. Thus, the suction pressure sensor may be applied to various engines and detection of suction pressure with high accuracy is possible.

In a further embodiment, a gas filter may be provided in the pipe.

According to this configuration, breakage of the gas filter due to the water residing therein or freezing of such water is prevented.

DETAILED DESCRIPTION OF THE PREFERRED EMBODIMENTS

A waterproof connecting structure for a pipe according to a first embodiment of the invention is described.

Figure 1:
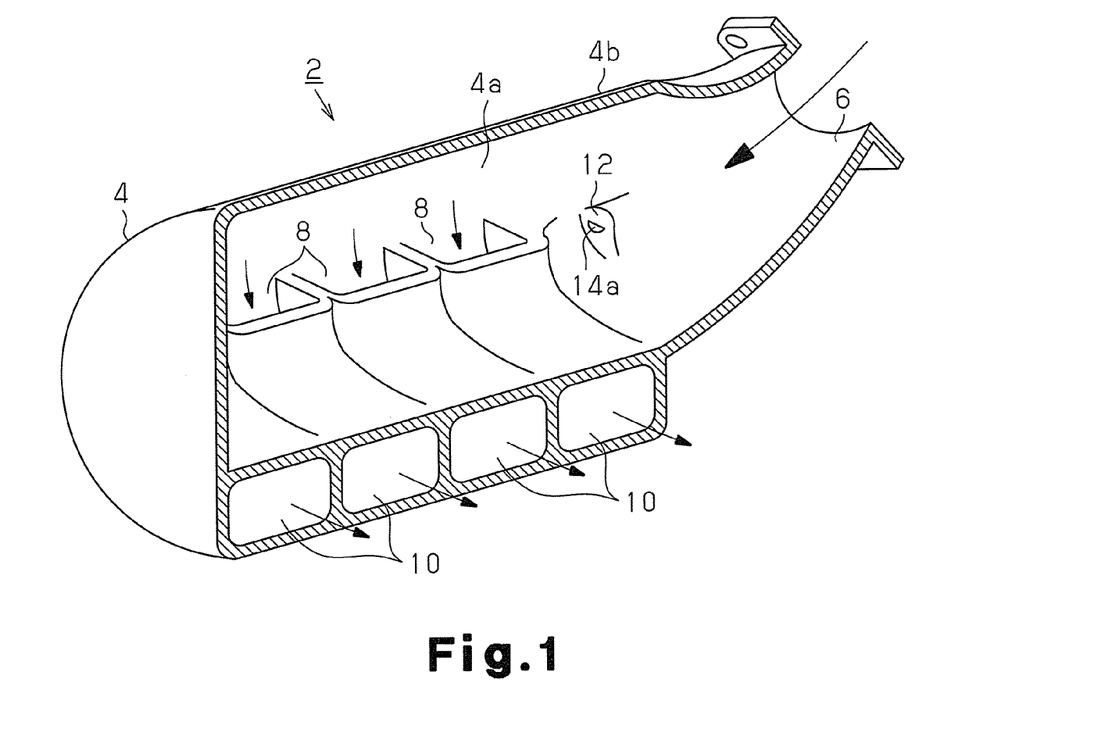
FIG. 1 is a perspective, longitudinal sectional view of a surge tank to which a waterproof connecting structure for a pipe according to a first embodiment of the invention is applied.

FIG. 1 is a perspective, longitudinal sectional view of a surge tank 4 integrated with an intake manifold 2 used for an internal combustion engine for a vehicle.

The intake manifold 2 is integrally formed by joining a plurality of parts including a surge tank 4 together by known technique such as vibration welding. The intake manifold 2 includes a guide portion 6 for guiding intake air in which intake air is supplied from a throttle valve connected with the guide portion 6. Intake air entering a space 4a in the surge tank 4 (indicated by a large arrow in FIG. 1) is sucked into supply ports 8 of the respective cylinders (four cylinders here) and divided through respective passages 10 to the respective cylinders.

Figure 2:
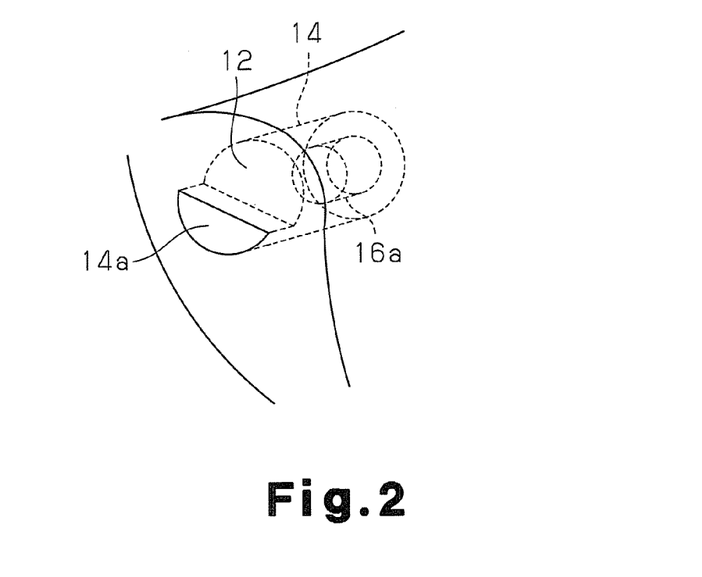
FIG. 2 is an enlarged perspective view of the waterproof connecting structure of the first embodiment.

Within the space 4a in the surge tank 4, a partition wall 12 is formed in an introduction passage for introducing intake air from the guide portion 6 to the supply ports 8. The partition wall 12 faces downstream relative to the flow of intake air and includes an outer face parallel with the direction of gravitational force. As illustrated in FIG. 2, a connecting space 14 is formed between the partition wall 12 and an outer peripheral surface 4b of the surge tank 4.

Figure 3:
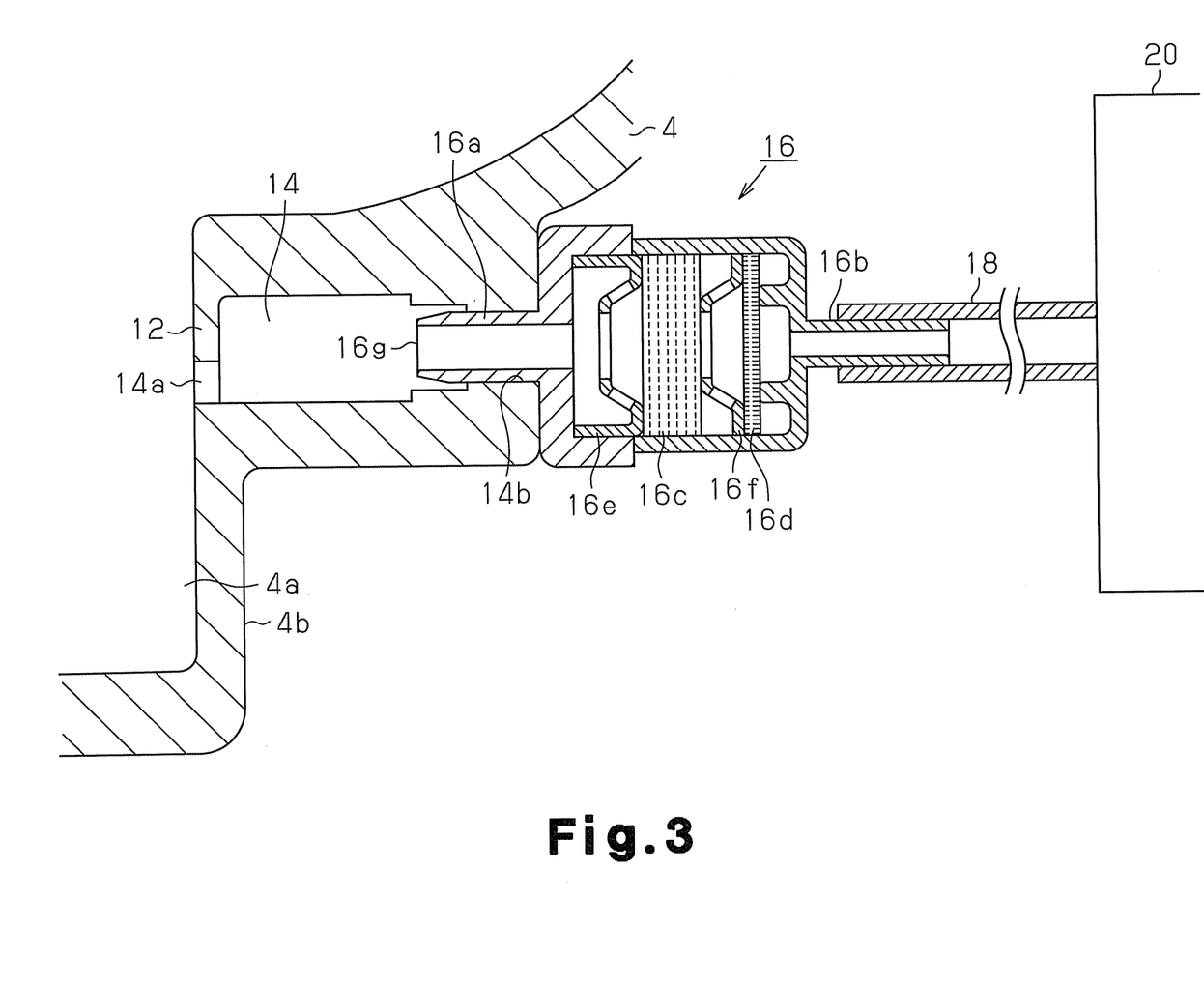
FIG. 3 is a longitudinal sectional view of the waterproof connecting structure of the first embodiment and related portions.

FIG. 3 illustrates a longitudinal sectional view of the waterproof connecting structure and the related portions. The connecting space 14 is a cylindrical space having an axis in a substantially horizontal direction or right-left direction in FIG. 3. The partition wall 12 closes one of the axial ends of the connecting space 14 and includes a hole 14a. The connecting space 14 communicates with the space 4a in the surge tank 4 via the hole 14a. A wall of the surge tank 4 on the side of the outer peripheral surface 4b, which corresponds to another one of axial ends of the connecting space 14, includes a fitting hole 14b at the center of the wall. A pressure conduit 16a of a gas filter 16 is fitted into the fitting hole 14b in close contact with each other. A connecting conduit 16b is formed in the gas filter at the opposite side of the pressure conduit 16a. The connecting conduit 16b is connected with a suction pressure sensor 20 via a rubber hose 18. Thus, intake pressure in the space 4a of the surge tank 4 is conveyed through the hole 14a, the connecting space 14, the gas filter 16, and the rubber hose 18 to the suction pressure sensor 20.

A metal filter 16c and a non-woven filter 16d are disposed in the gas filter 16 in that order from the pressure conduit 16a and fixed with leaf springs 16e and 16f respectively.

Figure 4:
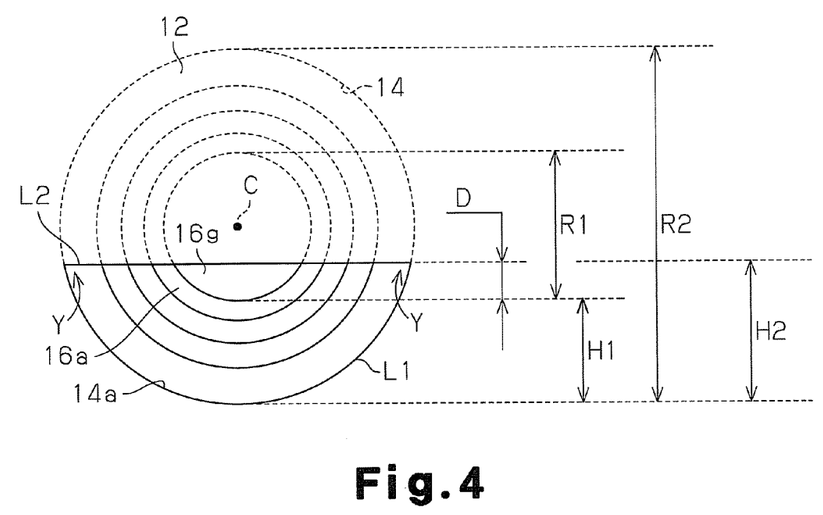
FIG. 4 is a front view illustrating a waterproof connecting structure of the first embodiment of EXAMPLE 1.

Referring now to FIG. 4, the positional relationship among the connecting space 14, the hole 14a, and the distal opening 16g of the pressure conduit 16a is illustrated. In particular, when viewed from the direction perpendicular to the outer face of the partition wall 12, a lower side L1 in an arcuate line defining a part of the hole 14a is an extension of a part of the internal peripheral face of the connecting space 14 in the axial direction of thereof and is the same with the line of the part of the internal peripheral face of the connecting space 14. An upper side L2 in a straight line extending in a horizontal direction of the hole 14a is formed below a central axis C of the connecting space 14.

The pressure conduit 16a protrudes in the connecting space 14 at the center of the connecting space 14 so that the center of the distal opening 16g of the pressure conduit 16a coincides with the central axis C of the connecting space 14. Height H1 of a lower end of the distal opening 16g of the pressure conduit 16a is lower than the height H2 of the upper side L2 of the hole 14a. Accordingly, when viewed from the direction perpendicular to the partition wall 12, a part of a circular area defined by the contour line of the distal opening 16g overlaps with a circular area of the hole 14a.

Now, a comparative study was conducted.

As an Example 1, an intake manifold 2 as illustrated in FIG. 4 was attached to a gasoline engine and a vehicle traveled for 2 hours. After that, the gas filter 16 was removed to measure a weight of water that had entered therein. The diameter R1 of the distal opening 16g of the pressure conduit 16a was 5 mm, the diameter R2 of the connecting space 14 was 12 mm, and the height H2 from the lowermost end of the lower side L1 to the upper side L2 was 5 mm. The axial length of the connecting space 14 was about 20 mm and the distance between the outer face of the partition wall 12 to the distal opening 16g in the axial direction of the pressure conduit 16a was 25 mm.

Figure 5:
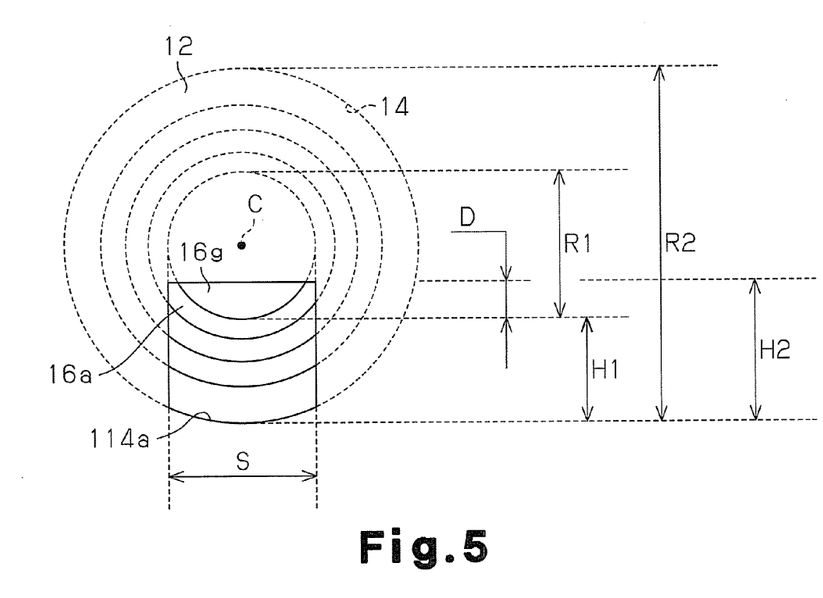
FIG. 5 is a front view illustrating a waterproof connecting structure of the first embodiment of EXAMPLE 2.

As an Example 2, the same configuration as EXAMPLE 1 was used except that width S of a hole 114a was made equal to the diameter R1 of the distal opening 16g (5 mm), as illustrated in FIG. 5. As described above, after the vehicle to which the gasoline engine was attached traveled for 3 hours, the gas filter 16 was removed to measure a weight of water that had entered therein.

As a Comparative Example, no connecting space 14 was formed in the surge tank 4 and the pressure conduit 16a was protruded directly into the space 4a of the surge tank 4 and the gas filter 16 was attached thereto. After the vehicle traveled for 2 hours, the gas filter 16 was removed to measure the weight of water that had entered therein.

The result was as follows:

Example 1: 14 mg

Example 2: 60 mg

Comparative Example: 191 mg

This result shows that the waterproof connecting structure for a pipe including the connecting space 14, the partition wall 12 and the hole 14a or 114a according to the first embodiment as illustrated in FIGS. 1 to 5 can prevent intrusion of water into the gas filter 16.

The area of the hole 14a in Example 1 is made greater than that of the hole 114a in Example 2. Thus, it is expected that more droplets enter the connecting space 14 from the space 4a of the surge tank 4 in Example 1 than in Example 2. However, in fact, the amount of water that entered the gas filter 16 was less in Example 1 than in Example 2. The reason for this is presumed to be as follows.

That is, comparing the hole 14a of Example 1 illustrated in FIG. 4 with the hole 114a of Example 2 illustrated in FIG. 5, the amount of water droplets that enter the hole from the space 4a of the surge tank 4 should be greater in Example 1 than in Example 2. However, since the shape of the open or transverse cross-sectional area of the hole 114a in Example 2 is generally square and not elongate, droplets attached around the hole 114a are likely to form a water membrane to block the entire hole 114a rather than the case in Example 1.

Accordingly, water droplets are temporarily stored in the connecting space 14, moved by pressure vibration in the space 4a, contacted with the distal opening 16g of the pressure conduit 16a, and transferred into the gas filter 16.

On the other hand, the shape of the open or transverse cross-sectional area of the hole 14a of Example 1 is elongate, i.e., the hole 14 has an arcuate lower side L1 and a straight upper side L2 as illustrated in FIG. 4. Therefore, the corners Y of the hole 14a are narrow so that attached water droplets are likely to stay in the corners Y. However, since the hole 14a is horizontally long, a water membrane is unlikely to form over the entire hole 14a. Specifically, the hole 14a is wide at the center and thus a water membrane is unlikely to occur at the center of the hole 14a.

Accordingly, drainage of water from the connecting space 14 to the space 4a of the surge tank is not impaired as compared with the case in Example 2. Thus, less water accumulates in the connecting space 14 and intrusion of the water into the gas filter 16 by pressure vibration is less likely to occur than in the case in Example 2. This is believed to be one reason why a difference in effect occurred between Example 1 and Example 2.

The first embodiment has the following advantages.

(1) Water droplets drifting in intake air within the intake passage (or the surge tank 4) and water droplets conveyed along the wall surface of the surge tank 4 sometimes reach the partition wall 12. Even in that case, the possibility for these water droplets to reach the hole 14a or 114a in the hole 14a or 114a can be lowered because the area of the hole 14a or 114a is made smaller than that of the partition wall 12.

In addition, the shape of the open or transverse cross-sectional area of the hole 14a as illustrated in FIG. 4 is elongate (the ratio of the shorter length to the longer length is about 0.4, which is smaller than ½). In particular, the hole 14a is formed of two sides: one is a curved, or arcuate lower side L1 extending on an edge of the partition wall 12 at a central angle less than 180° and the other is a straight upper side L2 extending horizontally. The hole 14a gradually narrows from the center of the hole 14a toward the opposite ends, or the corners Y.

Since the hole 14a of FIG. 4 has such a configuration, water tends to concentrate at the corners Y and a water membrane is unlikely to occur at the center due to surface tension properties. Thus, a water membrane over the entire hole 14a is unlikely to occur, allowing conveyance of gas to the gas detector (suction pressure sensor 20) via the hole 14a to be maintained in good condition. In addition, even if water droplets drifting in intake air enter into the connecting space 14, they are readily drained to the surge tank 4 via the hole 14a, the entire surface of which is not covered by a water membrane. Thus, both intrusion of the water droplets into the connecting space 14 and duration of the water droplets in the connecting space 14 are reduced.

Regarding the hole 114a of FIG. 5, water droplets are unlikely to enter the connecting space 14 via the hole 114a as compared with the hole 14a of FIG. 4. Even if the hole 114a is blocked by the water droplets, they are unlikely to intrude in the pressure conduit 16a. This is because the hole 114a is offset from the center of the distal opening 16g of the pipe (the pressure conduit 16a) and the hole 114a is unlikely to contact with the distal opening 16g even if a water membrane formed on the hole 114a is vibrated by pressure vibration in the surge tank 4.

The open areas of the hole 14a and 114a of FIGS. 4 and 5 are smaller than that of the partition wall 12, and the transverse cross-sectional area of the connecting space 14 is enlarged as compared with that of the holes 14a and 114a. Thus, it is less likely that water entering into the connecting space 14 will block the holes 14a and 114a. The diameter of the connecting space 14 is also larger than that of the pressure conduit 16a. Accordingly, it is less likely that water having entered the connecting space 14 will block the distal opening 16g.

As such, the holes 14a and 114a of FIGS. 4 and 5 serve to reduce intrusion of water droplets drifting in through intake air as well as water droplets moving along the wall surface of the surge tank 4. In addition, this water-proof connecting structure is achieved by providing the pressure conduit 16a with connecting space 14, the partition wall 12, and the hole 14a or 114a. Thus, the degree of freedom in location for attaching the structure to the surge tank 4 is extremely high.

(2) As illustrated in FIGS. 4 and 5, the remaining part of the partition wall 12 excluding the hole 14a or 114a overlaps with a part of the distal opening 16g of pressure conduit 16a, when viewed from the direction perpendicular to the partition wall 12. Thus, water droplets are less likely to enter the distal opening 16g of the pressure conduit 16a, whereby water-proof properties are enhanced.

(3) The hole 14a of FIG. 4 is offset to extend along the edge of the partition wall 12, i.e., the lower side L1 corresponds to the edge of the partition wall 12. The open or transverse cross-sectional area of the hole 14 is longer at the edge of the partition wall 12 and shorter in the radial direction of the partition wall 12. Thus, even if water enters and stays in the connecting space 14, it will be easily discharged from inside the connecting space 14 to the surge tank 4. In addition, since the hole 14a extends along the edge of the partition wall 12, the distal opening 16g may be positioned to be offset from the center of the hole 14a when the pressure conduit 16a is disposed, whereby water-proof properties are enhanced.

The hole 114a of FIG. 5 also extends along the edge of the partition wall 12. Thus, similar to the case of the hole 14a, water within the connecting space 14 can be easily discharged via the hole 114a to the surge tank 4, whereby water-proof properties are enhanced. In addition, the distal opening 16g may be positioned offset from the center of the hole 114a when the pressure conduit 16a is disposed, whereby water-proof properties are enhanced.

(4) When the amount of water intruded in the connecting space 14 is increased, water tends to move to a lowermost part of the connecting space 14 in a gravitational direction. In this embodiment, the edge of the partition wall 12 at which the holes 14a and 114a resides is located in a lowermost part of the partition wall 12. Thus, a large amount of water in the connecting space 14 can be easily drained, whereby water-proof properties are enhanced.

(5) As illustrated in FIG. 3, the distal end of the pressure conduit 16a protrudes into the connecting space 14 and the distal opening 16g therein is spaced from the internal surface of the connecting space 14. This configuration reduces or prevents water on the internal surface of the connecting space 14 from entering the distal opening 16g, whereby water-proof effect on the gas filter 16 or the suction pressure sensor 20 is enhanced.

The waterproof connecting structure for a pipe of the first embodiment is applied to the pipe connection of suction pressure sensor 20 for measuring air pressure in an intake passage of an internal combustion engine, which enables sufficient waterproofing against water droplets drifting in through intake air. In addition, the waterproof connecting structure may be formed by providing the connecting space 14, the partition wall 12, and the hole 14a or 114a only, at the connection of the pressure conduit 16a. Thus, the degree of freedom of location to attach the structure to the surge tank 4 is extremely high. The suction pressure sensor 20 is thus readily applicable to various kinds of internal combustion engines to detect suction pressure with high accuracy.

6) Water is also unlikely to enter the gas filter 16, which is closer to the surge tank 4 than the suction pressure sensor 20. That is, breakage of the gas filter 16 due to the water residing therein or freezing of such water is prevented.

The above embodiment may be modified as follows.

Figure 6A:
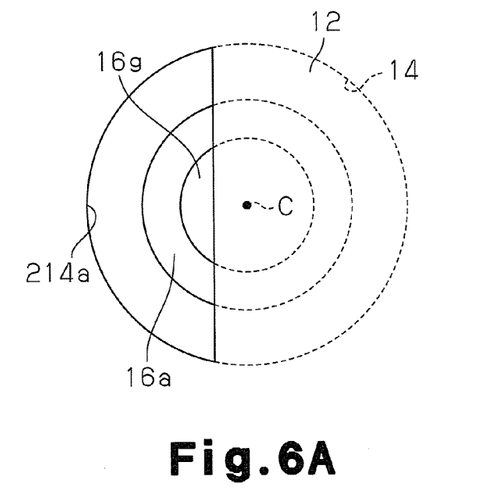
FIGS. 6A to 6D are front views illustrating other waterproof connecting structures for a pipe.

In the first embodiment, the hole 14a is located on the side of the edge of the partition wall 12, wherein the edge is the lowermost part of the partition wall 12 in a gravitational direction. Alternatively, as illustrated in FIG. 6A, the hole may be located on the side of the edge which is a middle part of the partition wall 12 in a gravitational direction, as illustrated as a hole 214a. In such a case, water in the connecting space 14 drains from a lower end of the hole 214a to the surge tank. Thus, a similar effect as in the hole 14a of FIG. 4 can be obtained.

Figure 6B:
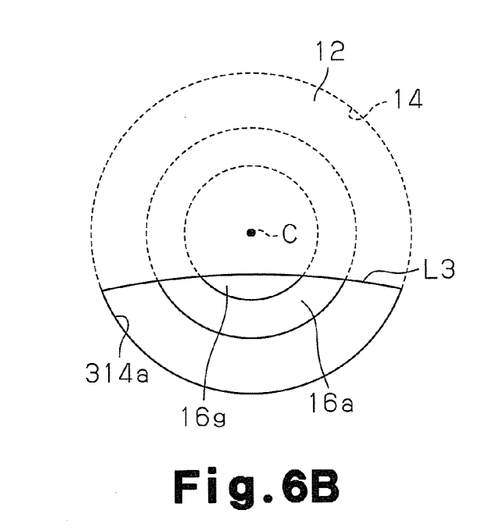

As illustrated in FIG. 6B, the upper side may be upwardly convex as a hole 314a having a convex upper side L3, instead of the straight upper side L2 in FIG. 4. In this configuration, the hole 314a is wide at the center, which is effective in improving drainage of water.

Figure 6C:
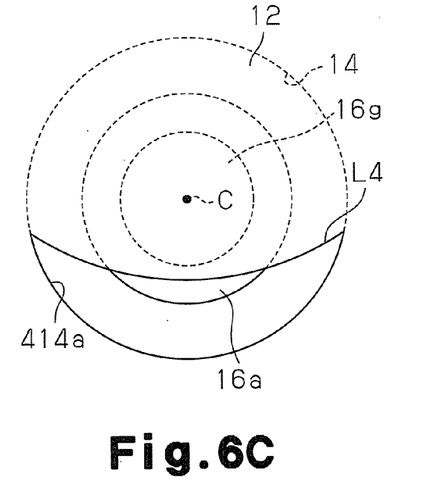

As illustrated in FIG. 6C, the upper side may also be downwardly convex as a hole 414a having a concave upper side L4. In this configuration, the hole 414a is narrow at the center, which is effective in reducing or preventing intrusion of water droplets. Further, the partition wall 12 coincides with the entire distal opening 16g, which is effective in reducing or preventing intrusion of water droplets into the distal opening 16g.

Figure 6D:
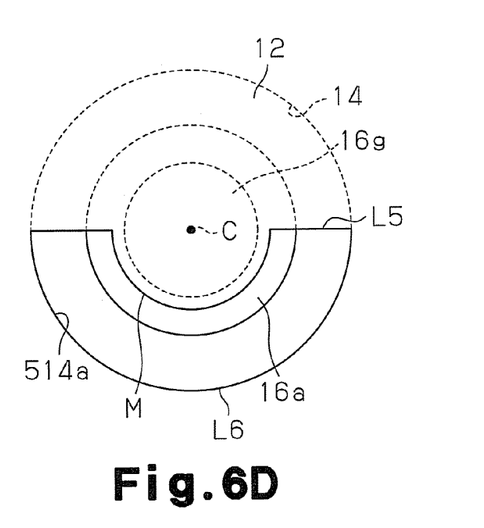

As illustrated in FIG. 6D, the opposite ends of the upper side L5 may be located on the horizontal phantom line passing the central axis C and only a center portion of the hole 514a of the upper side L5 may be protruded toward the lower side L6. Then, the protruded line M may coincide with the entire distal opening 16g of the pressure conduit when viewed from a direction perpendicular to the partition wall 12. This configuration is effective to reduce or prevent direct intrusion of water droplets into the distal opening 16g.

Figure 7:
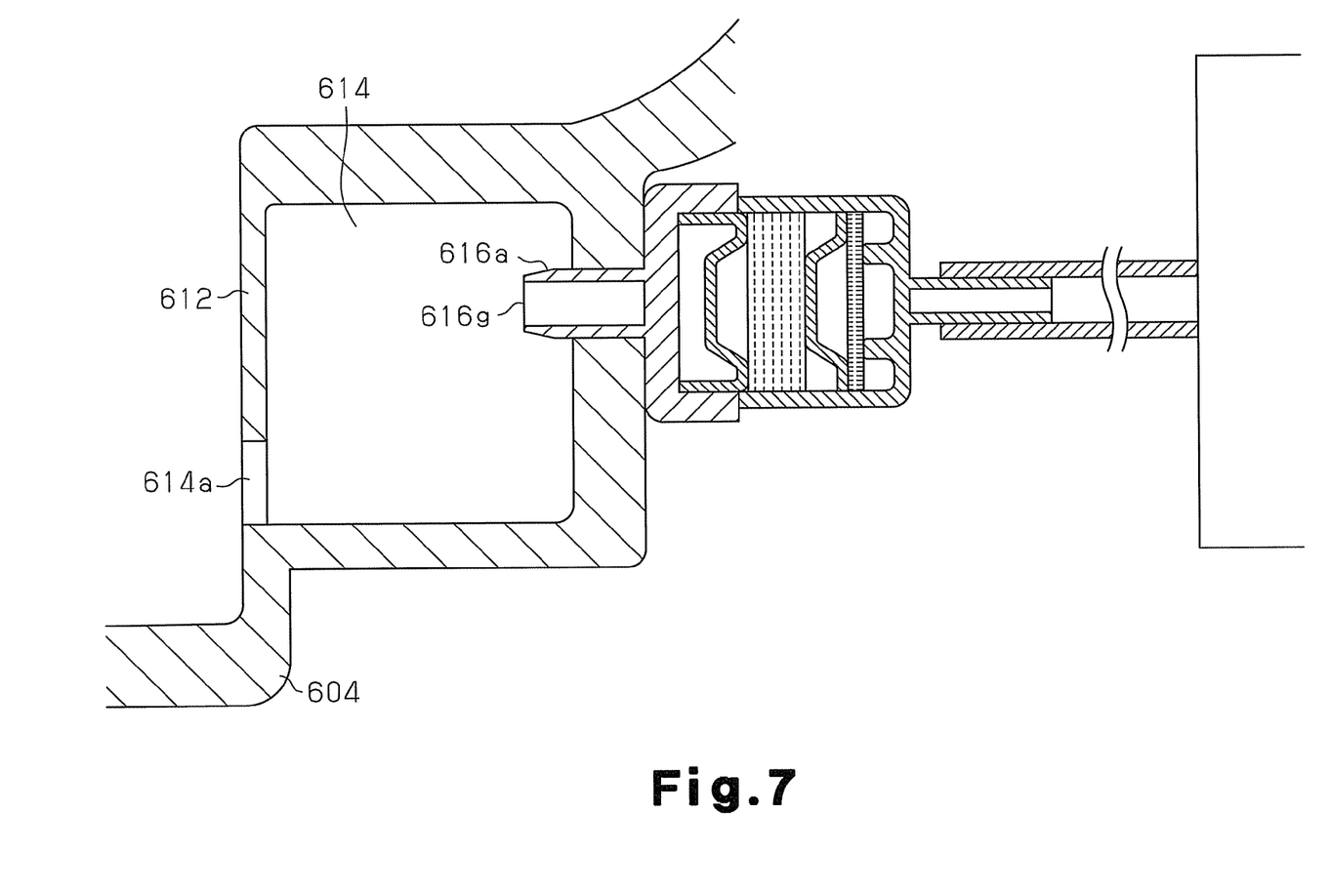
FIG. 7 is a longitudinal sectional view illustrating another connecting space.

As illustrated in FIG. 7, when viewed from the direction perpendicular to the partition wall 12, the position of the hole 614a and that of the distal opening 616g of the pressure conduit 616a may be offset greatly by making the connecting space 614 in the form of cylinder have a large diameter. In such a case, the hole 614a is positioned at the lowermost part of the partition wall 612 in a gravitational direction and the pressure conduit 616a is positioned as uppermost in a gravitational direction as possible. This configuration prevents water droplets from reaching the distal opening 616g even when a large amount of the water droplets enters the connecting space 614 from inside the surge tank 604 temporarily and accumulates in the connecting space 614.

In the above embodiments, the partition wall, in which the hole is formed, is an outer face parallel with the direction of gravitational force that faces in a downstream of the flow of intake air in the surge tank. However, the partition wall may be positioned in another part in the surge tank. For example, the partition wall may face downward and extends in a horizontal direction or may extend obliquely downwardly.

The invention claimed is:

1. A waterproof connecting structure for connecting an intake passage of an internal combustion engine to an external gas detector through a pipe to conduct gas from the intake passage to the external gas detector, the structure comprising:
    a tank forming the intake passage and having an outer peripheral wall;
    a partition wall having a central axis;
    a connecting space formed between the partition wall and the outer peripheral wall;
    a hole formed in the partition wall and adapted to place the intake passage and the connecting space in fluid communication, wherein the hole has a smaller cross-sectional area than that of the partition wall; and
    a pressure conduit and a connecting element provided at an end of the pipe and connected to the connecting space so as to fluidly connect the intake passage to the pipe through the hole and the connecting space, the pressure conduit including a distal opening having a central axis parallel to the central axis of the partition wall, the distal opening facing the partition wall through the connecting space, the connecting space having a larger diameter than the pressure conduit;
    wherein the hole is disposed offset from the central axes of the partition wall and the distal opening of the pressure conduit and extends along an edge of the partition wall.

2. The waterproof connecting structure according to claim 1, wherein the central axis of the partition wall coincides with the central axis of the distal opening of the pressure conduit.

3. The waterproof connecting structure according to claim 1, wherein the hole is defined by two sides, wherein one of the two sides is an arcuate line and the other of the two sides is a straight line connecting both ends of the arcuate line.

4. The waterproof connecting structure according to claim 1, wherein the hole is defined by two sides, wherein the two sides are different arcuate lines that are curved in the same direction.

5. The waterproof connecting structure according to claim 1, wherein the hole is defined by two sides, wherein one of the two sides is an arcuate line having a central angle less than 180 and the other of the two sides is an arcuate line that is curved in the opposite direction from the direction in which the one side is curved.

6. The waterproof connecting structure according to claim 1, wherein the hole is defined by two arcuate sides and two straight sides, wherein the two arcuate sides are part of two concentric circles having different radii and curved in the same direction, wherein each of the two straight sides connects opposing ends of the two arcuate sides.

* * * * *

UNITED STATES PATENT AND TRADEMARK OFFICE
CERTIFICATE OF CORRECTION

| | | |
|---|---|---|
| PATENT NO. | : 8,359,910 B2 | Page 1 of 1 |
| APPLICATION NO. | : 12/602971 | |
| DATED | : January 29, 2013 | |
| INVENTOR(S) | : Ishikawa et al. | |

It is certified that error appears in the above-identified patent and that said Letters Patent is hereby corrected as shown below:

On the title page, at item 73, the Assignees:
Delete "Aisin Seiki Kabushika" and insert therefor --Aisin Seiki Kabushiki--.

Signed and Sealed this
Seventeenth Day of September, 2013

Teresa Stanek Rea
*Deputy Director of the United States Patent and Trademark Office*